US008889253B2

(12) United States Patent
Kekicheff et al.

(10) Patent No.: US 8,889,253 B2
(45) Date of Patent: Nov. 18, 2014

(54) COVERING A SUBSTRATE WITH A POLYMER FILM THAT IS STABLE IN A LIQUID MEDIUM

(75) Inventors: Patrick Kekicheff, Strasbourg (FR); Maryline Clauzel, Fellering (FR)

(73) Assignee: Centre National de la Recherche Scientifique (CNRS), Paris (FR)

( * ) Notice: Subject to any disclaimer, the term of this patent is extended or adjusted under 35 U.S.C. 154(b) by 694 days.

(21) Appl. No.: 12/937,201

(22) PCT Filed: Apr. 10, 2009

(86) PCT No.: PCT/EP2009/054354
§ 371 (c)(1),
(2), (4) Date: Oct. 8, 2010

(87) PCT Pub. No.: WO2009/125018
PCT Pub. Date: Oct. 15, 2009

(65) Prior Publication Data
US 2011/0027567 A1 Feb. 3, 2011

(30) Foreign Application Priority Data
Apr. 10, 2008 (FR) ...................................... 08 52408

(51) Int. Cl.
B05D 3/00 (2006.01)
B05D 3/10 (2006.01)
B05D 5/02 (2006.01)
C09D 133/06 (2006.01)
C09D 125/06 (2006.01)
B82B 3/00 (2006.01)
B32B 3/00 (2006.01)
B05D 3/02 (2006.01)
B05D 3/06 (2006.01)
B05D 1/36 (2006.01)

(52) U.S. Cl.
CPC ... B32B 3/00 (2013.01); B05D 3/02 (2013.01); B05D 3/06 (2013.01); B05D 1/36 (2013.01); B05D 3/00 (2013.01)
USPC .......................................... 428/220; 427/203

(58) Field of Classification Search
CPC .............. B32B 3/00; B05D 1/36; B05D 3/02; B05D 3/06
USPC .......................................... 427/203; 428/220
See application file for complete search history.

(56) References Cited

FOREIGN PATENT DOCUMENTS

| JP | 4-268081 A | 9/1992 |
| JP | 2003-94546 A | 4/2003 |
| JP | 2004-509209 A | 3/2004 |
| JP | 2006-327187 A | 12/2006 |
| JP | 2007-199702 A | 8/2007 |
| WO | WO 99/47253 A1 | 9/1999 |
| WO | WO 02/22746 A1 | 3/2002 |
| WO | WO 2007/095158 A2 * | 8/2007 |

OTHER PUBLICATIONS

Guenter Reiter, "Dewetting as a Probe of Polymer Mobility in Thin Films", Macromolecules, 1994, pp. 3046-3052, vol. 27, No. 11.
Michael Pannek, et al., "Effect of a bell-shaped cover in spin coating process on final film thickness", Mat Res Innovat, 2001, pp. 340-343, vol. 4.
Kenneth E. Strawhecker, et al., "Communications to the Editor", Macromolecules, 2001, pp. 4669-4672, vol. 34, No. 14.
Olivier Spalla, et al., "Adhesion between Oxide Nanoparticles: Influence of Surface Complexation", Journal of Colloid and Interface Science, 1997, pp. 43-65, vol. 192.
Bryan B. Sauer, et al., "Effect of Solvent Casting on Reduced Entanglement Density in Thin Films Studied by Ellipsometry and Neutron Reflection", Macromolecules, 1994, pp. 432-440, vol. 27, No. 2.
Minou Nabavi, et al., "Surface Chemistry of Nanometric Ceria Particles in Aqueous Dispersions", Journal of Colloid and Interface Science, 1993, pp. 459-471, vol. 160.
Gordon P. Bierwagen, "Reflections on corrosion control by organic coatings", Progress in Organic Coatings, 1996, pp. 43-48, vol. 28.
L. B. R. Castro, et al., "The Effect of Water or Salt Solution on Thin Hydrophobic Films", Langmuir, 2004, pp. 7610-7615, vol. 20, No. 18.
Gero Decher, "Fuzzy Nanoassemblies: Toward Layered Polymeric Multicomposites", Science, Aug. 29, 1997, pp. 1232-1237, vol. 277.
A. C. Rouw, "Model epoxy powder coatings and their adhesion to steel", Progress in Organic Coatings, 1998, pp. 181-192, vol. 34.
Johannes Schmitt, et al., "Metal Nanoparticle/Polymer Superlattice Films: Fabrication and Control of Layer Structure", Communications, Adv. Mater., 1997, vol. 9, No. 1.
International Search Report dated Sep. 4, 2009 (Four (4) pages).
English Translation of JP 4-268081 A (previously filed as B6) (fifteen (15) pages), Sep. 1992.

\* cited by examiner

*Primary Examiner* — William Phillip Fletcher, III
(74) *Attorney, Agent, or Firm* — Crowell & Moring LLP

(57) ABSTRACT

The present invention relates to a process for covering a substrate with a polymer film characterized in that, prior to the deposition of said polymer film, nanoparticles are adsorbed electrostatically onto the surface of said substrate to be covered.

29 Claims, 10 Drawing Sheets

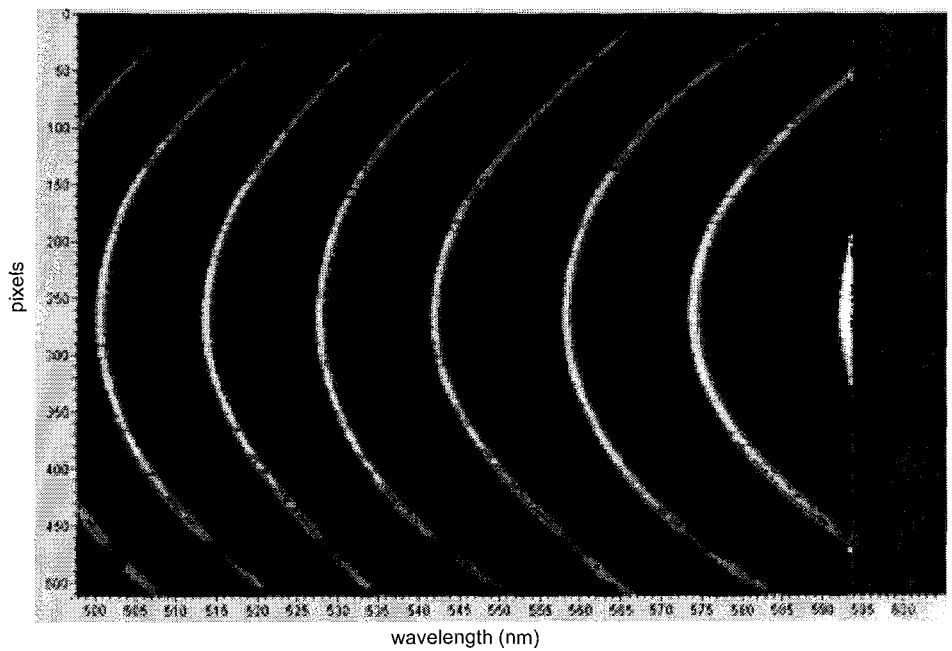
Figure 2A
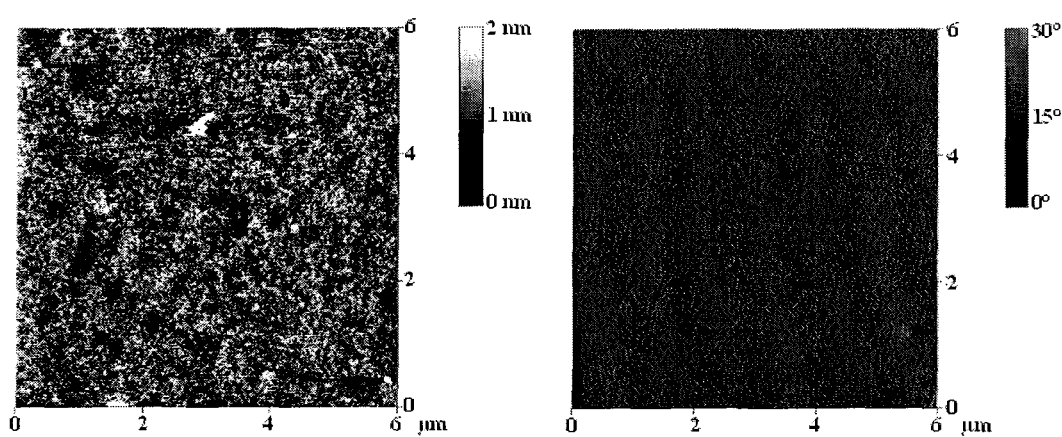
Figure 2B                    Figure 2C

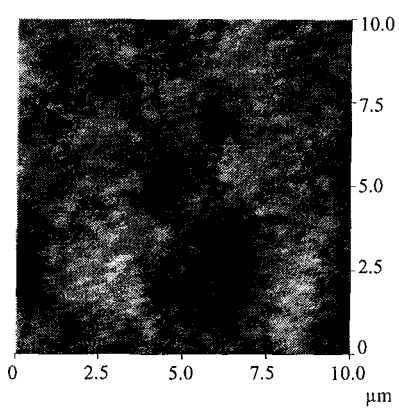
Figure 4A1
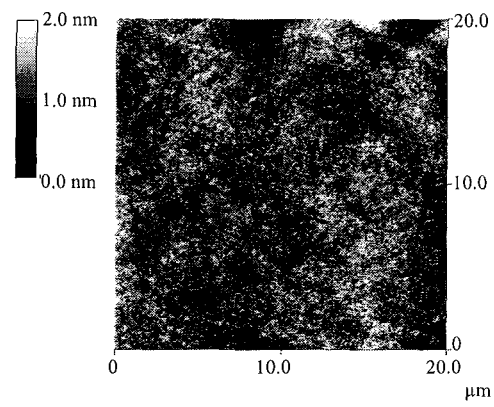
Figure 4A2
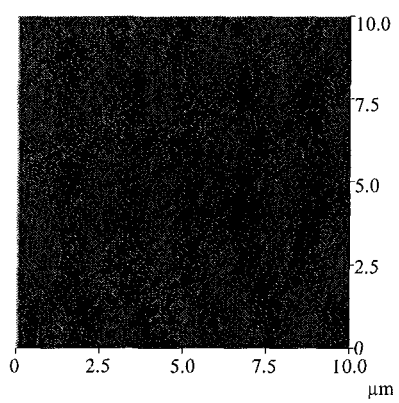
Figure 4B1
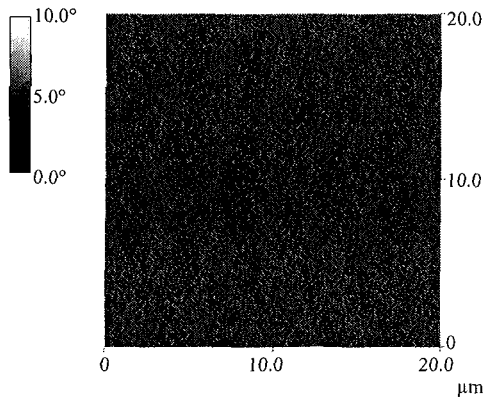
Figure 4B2

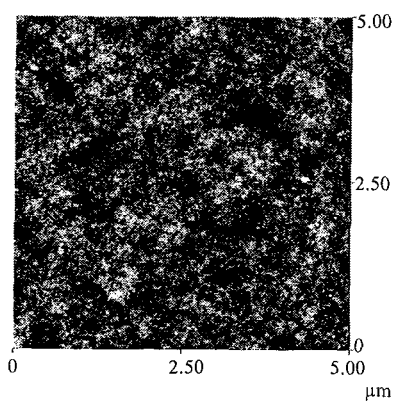
Figure 5A1
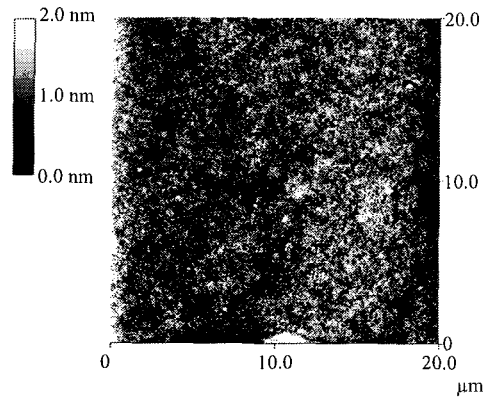
Figure 5A2
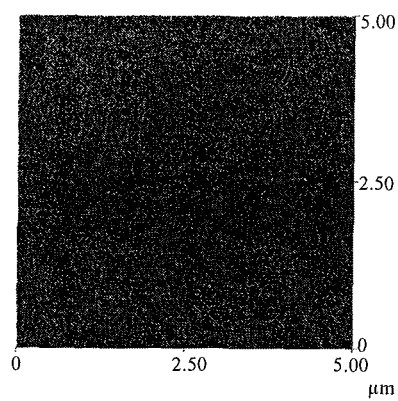
Figure 5B1
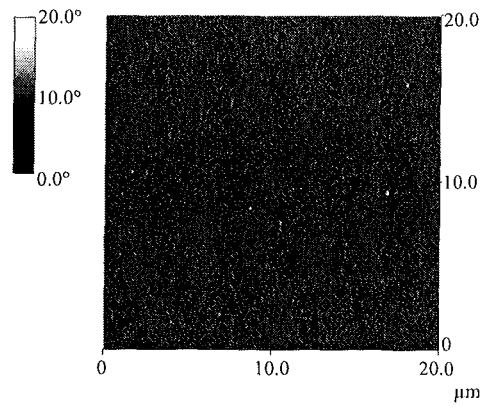
Figure 5B2

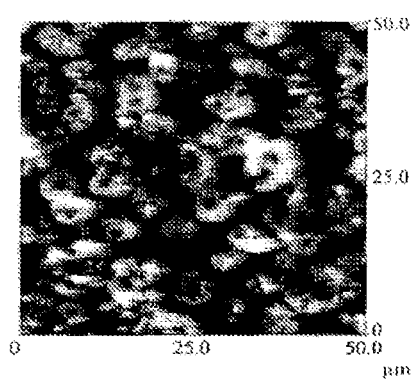
Figure 7A1
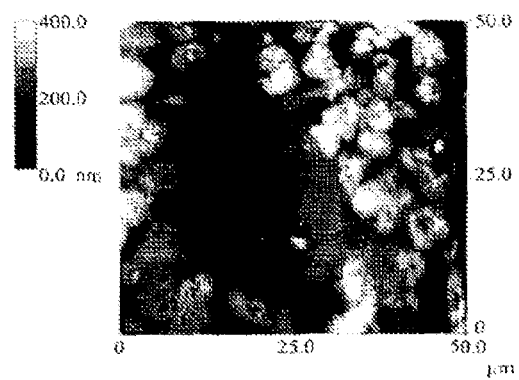
Figure 7A2
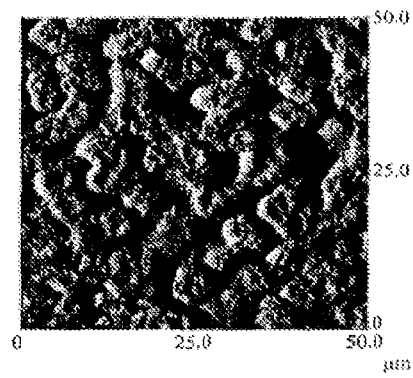
Figure 7B1
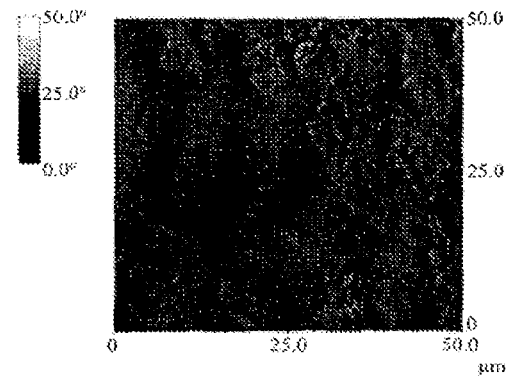
Figure 7B2

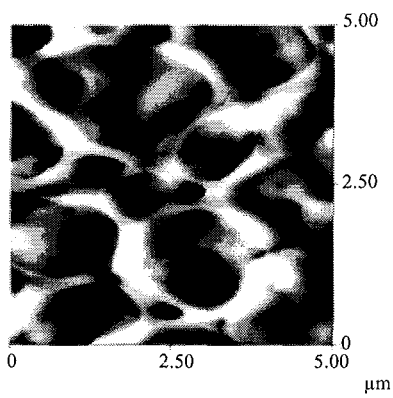
Figure 8A1
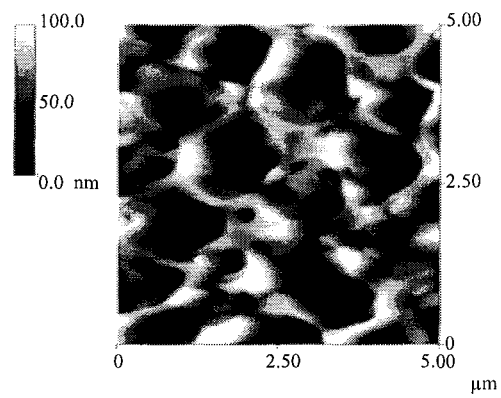
Figure 8A2
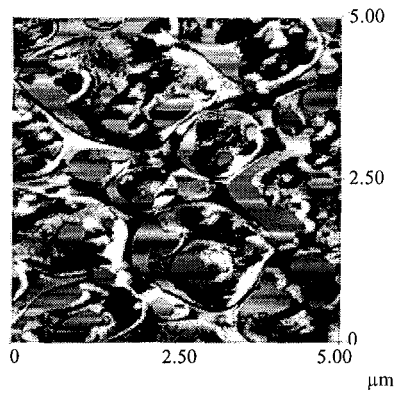
Figure 8B1
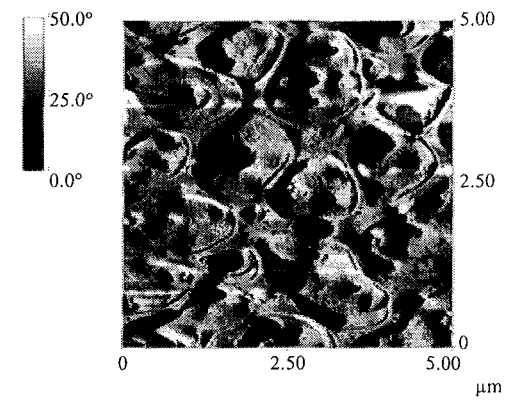
Figure 8B2

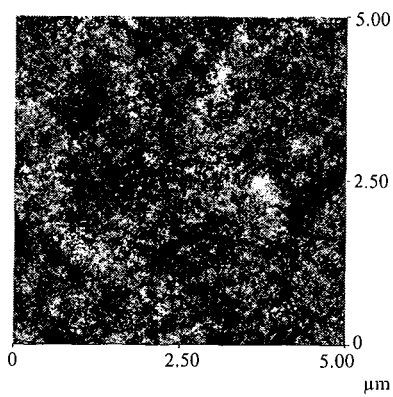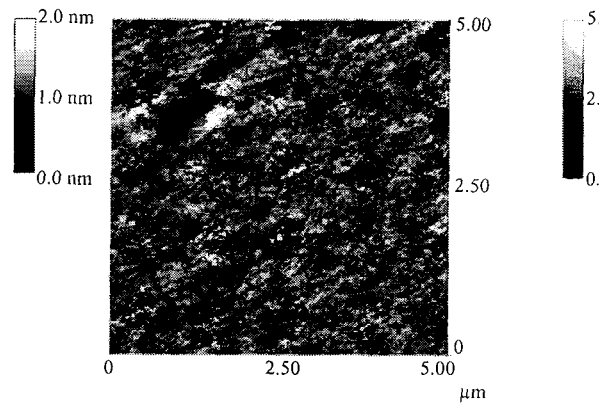
Figure 9A1                Figure 9A2
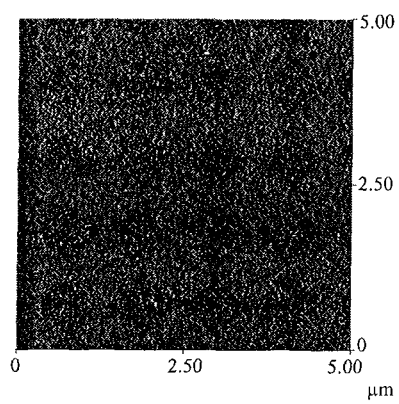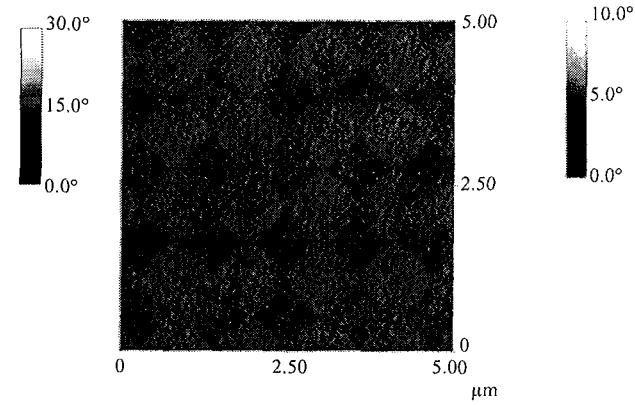
Figure 9B1                Figure 9B2

COVERING A SUBSTRATE WITH A POLYMER FILM THAT IS STABLE IN A LIQUID MEDIUM

This application is a national stage of PCT International Application No. PCT/EP2009/054354, filed Apr. 10, 2009 which claims priority under 35 U.S.C. §119 to French Patent Application No. 0852408, filed Apr. 10, 2008, the entire disclosure of which is herein expressly incorporated by reference.

The present invention relates to a process for covering a substrate with a polymer film and also to the substrate obtainable by such a process. This process makes it possible to obtain a polymer film which remains stable even in a liquid or vapour environment, regardless of whether this is in a static or moving medium such as in a liquid flow.

Coating a surface with a polymer film is used in many fields to protect a substrate from the external medium or to modify its surface properties.

For instance, an anticorrosion or antibacterial treatment may be obtained in particular by covering a substrate with a polymer film. Similarly, sensitive devices or components, such as in particular sensors or optical instruments, may be covered with a protective polymer film in order to preserve them from the external medium and in particular to confer protection against scratches or reflection.

Various techniques for pretreating the surface of the substrate, prior to the deposition of the polymer film, presently exist for making it possible to improve the anchoring and adhesion of the polymer film onto the substrate. Mention may be made for example of a pretreatment by cold plasma, under a water, argon or air atmosphere for example, making it possible to activate the surface of the substrate by making it hydrophilic in particular, which may optionally be followed by a silanisation in a gas or liquid phase, which makes it possible to graft silane groups onto the surface of the substrate.

However, these various techniques involve modifying the physicochemical properties and the chemical nature of the surface of the substrate.

Furthermore, cold plasma pretreatment often takes a very long time to carry out.

In the particular case of silanisation, it is difficult to control the density and homogeneity of silanes grafted onto the surface of the substrate, silane having the additional disadvantage of being rather corrosive. In addition, the choice of the type of silane used will be made as a function of the chemical nature of the polymer.

Furthermore, these methods do not always allow good adhesion of the polymer film onto the substrate, in particular in a vapour or liquid environment and in particular when the substrate is immersed in a liquid medium.

Indeed, such methods do not prevent the formation of microscopic defects, holes or cavities at the polymer film-substrate interface. The infiltration of vapour or liquid is then permitted at this polymer film-substrate interface, which locally destabilises the anchoring of the polymer chains to the substrate, leading in the longer term to the initially mesoscopic dewetting and then to the final macroscopic delamination of the polymer film.

The present invention therefore relates to a new process for covering a substrate with a polymer film, characterised in that, prior to the deposition of said polymer film, nanoparticles are adsorbed electrostatically onto the surface of said substrate to be covered.

WO 2007/095 158 describes a process for preparing a substrate having a porous surface for an application in chromatography by forming alternate multilayers of oppositely charged polyelectrolyte and nanoparticles, followed by the elimination of the intermediate layers of polyelectrolyte so as to retain only the nanoparticles. On the one hand this process is not aimed at obtaining a substrate coated with a stable polymer film since the polymer is intended to be removed, and on the other hand the substrate in question is of micrometric size, in particular between 1 and 250 µm.

Similarly, WO 99/47 253 describes the production of particles coated with alternate multilayers of oppositely charged polyelectrolyte and nanoparticles. However, this process aims in particular to prepare "empty shells" for serving as a carrier for a medicament, these "shells" being obtained by eliminating the substrate and optionally the polyelectrolyte layers. Said document is therefore not aimed at obtaining a stable deposition of a polymer film on a substrate as in the context of the present invention. Furthermore, the substrates used in said document have a mean diameter of less than 15 µm.

"Nanoparticles" are to be understood to mean solid particles of nanometric size, that is to say at least one of the dimensions is nanometric (and preferably all), that is to say less than one micrometer.

"Substrate" is to be understood to mean in particular a solid support intended to be covered with the polymer film, of macroscopic size, that is to say at least one dimension of the substrate is greater than one millimeter, and in particular greater than one centimeter, and preferably all the dimensions of the substrate are greater than one millimeter, and in particular one centimeter.

For example, in the case of a sphere, the diameter must be greater than 1 mm; in the case of a parallelepiped at least the length, the width or the height must be greater than 1 mm; in the case of a pipe or a cylinder at least the diameter or the length must be greater than 1 mm.

"Polyelectrolyte" is to be understood to mean, in the sense of the present invention, a polymer in which the repeating unit carries at least one electrolyte group, an electrolyte denoting a group which is an ion conductor when placed in water. In solution in a polar solvent such as water, the polyelectrolyte dissociates, causing charges to appear on its backbone and counter-ions in solution. The polyelectrolyte may be composed of a set of identical or different electrolyte groups.

"Electrostatically adsorbed" is to be understood to mean that the nanoparticles attach to the surface of the substrate essentially by means of electrostatic interactions, that is to say essentially devoid of any covalent bonds. In simplified terms, electrostatic interactions are interactions between opposite charges and may be in particular interactions between electrical charges, multipolar interactions, hydrophobic interactions, hydrogen bonds, electrical images, ion-ion correlations or combinations thereof. Van der Waals interactions or complexing phenomena may also be involved, making it possible to reinforce the adsorption of the nanoparticles onto the substrate.

Indeed, interactions in a liquid medium are very complex and result from the combination of several phenomena. For instance, the interface of a material immersed in a liquid medium becomes electrically charged and is surrounded not only by a distribution of counter-ions (ions carrying an electrical charge of the opposite sign to that of the electrical charge of the interface) but also by a distribution of co-ions (ions of the same sign as that of the interface). The concentration gradients of these ions starting from the charged interface depend on several parameters. In aqueous solution, mention may be made of the pH of the solution, the ionic force, the valency of the ions present, the chemical nature of the ions (which will influence the hydration thereof; Hofmeister series), the size thereof, the dipolar and multipolar interactions, but also the possibility of adsorption of these ions onto the interface (Stern layer, diffuse electrical layer), the sharing of hydration water of these ions with the hydration water of the interface, the complexing of the interface, the hydrogen bonds, the hydrophobic forces, without forgetting the role of the confinement of the liquid film close to the interface, which causes inter alfa ion-ion position correlations and thus forces which may become attractive at short range even if the ions carry an electrical charge of the same sign as the charged interface. The complexity of these phenomena therefore creates a subtle balance between the interactions, so that charged nanoparticles in solution can interact in a very diverse manner with the substrate and may be adsorbed under solution conditions that the person skilled in the art knows very well to select according to the nature of the nanoparticles used and the given substrate.

In the process of the invention, it would appear that the adsorption of nanoparticles onto the surface of the substrate to be covered creates a controlled local nanometric roughness at each point of the surface of the substrate, creating numerous anchoring points for the polymer on the microscopic level. Under these conditions, the polymer film can mate perfectly with the surface of the substrate, regardless of its shape or its topography. For instance, the substrate may have a flat, curved or uneven geometry with considerable height variations or the presence of ridges or hollows; it may be smooth or rough and may have imperfections. It can also be envisaged to cover a substrate having a porous surface.

The polymer film then adheres perfectly to the substrate at each point of its surface, avoiding the formation of microscopic cavities, hollows, holes or defects, and therefore remains stable in a vapour or liquid environment, regardless of whether it is in a static environment or in a fluid flow.

It seems thus that the fact that the process of the invention makes it possible to obtain polymer films which are stable even in a liquid or vapour environment is a result of improving the local properties of anchoring of the polymer film onto the substrate.

Under these conditions, the chemical properties of the polymer do not need to be modified in order to allow the anchoring of the film onto the substrate, this anchoring being essentially physical and not chemical in nature, which makes it possible to cover the substrate with any type of polymer and to preserve the functional properties of the polymer.

Similarly, the chemical nature of the substrate and the shape thereof are not modified by the process of the invention.

This process is therefore particularly attractive since it can be applied to any type of substrate and to any type of polymer for simple and low-cost implementation.

In particular, the substrate may comprise a surface to be covered which is metallic, comprising in particular steel, stainless steel, a metal such as aluminium, gold, silver, iron, lead, copper, zinc, nickel, titanium, tungsten, chromium, platinum, cobalt, zirconium, molybdenum, tin, gallium, ruthenium, yttrium and manganese, an alloy such as brass or bronze, or a mixture thereof; and/or mineral, comprising in particular pozzolana, clays, sand, gravels, perlite, vermiculite, mineral wools, graphite or an aluminosilicate such as mica, silicon, glass, a metal oxide such as sapphire, or a mixture thereof; and/or polymer, comprising in particular polytetrafluoroethylene (better known under the name Teflon) (PTFE), polydimethylsiloxane (PDMS), polycarbonate (PC), epoxy resin or polyvinyl chloride (PVC); and/or organometallic; and/or organic, such as cellulose, wood and derivatives thereof such as fibres or bark, and fruit shells and skins such as a coconut shell; and/or in ceramic.

In one particular embodiment, the substrate may comprise a surface to be covered which is metallic, comprising steel, stainless steel, a metal such as aluminium, gold, silver, iron, lead, copper, zinc, nickel, titanium, tungsten, chromium, platinum, cobalt, zirconium and manganese, or a mixture thereof; and/or mineral, comprising in particular an aluminosilicate such as mica, silicon, glass, a metal oxide such as sapphire, or a mixture thereof.

Said surface to be covered may have a specific surface area greater than 1 $mm^2$, in particular greater than 1 $cm^2$. It may consist in a single area of the surface of the substrate (said area optionally being perforated) or on the contrary in a set of several separate areas, thus covering certain zones of the substrate.

The process of the invention may in particular be doubly interesting in certain types of deposition of the polymer film for obtaining perforated or separate covered surface areas since it may make it possible both to sufficiently attach the film to the desired locations on the surface and to eliminate in a satisfactory manner the polymer residues remaining in the zones where the polymer is not desired.

For instance, in the particular case of deposition of a photosensitive polymer material (such as latex colloids), followed by exposure to light (for example that of a laser having a wavelength close to the spectral sensitivity of the material, regardless of whether this is in ultraviolet UV, in visible or in infrared IR, which makes it possible for example to cause the latex colloids to coalesce and to create a continuous film in the zone exposed to the light), the zones exposed to the light may acquire a different structure (for example continuous film rather than adsorbed spheroidal colloids) and/or different physicochemical properties (for example degree of hydrophilicity or hydrophobicity) than those of the zone not exposed to light. For instance, by a choice of pH washing conditions governed in particular by the respective isoelectric points of the nanoparticles and substrate used, in addition to other criteria described elsewhere in this document, the desorption of the polymer material in the undesired zones (for example zones not exposed to light) can be encouraged and, as a result, the presence of polymer residues in these zones will then be effectively eliminated, whereas this same material can remain attached to the substrate in the desired zones, its adhesion to the substrate even being reinforced as a result. Our invention thus doubly reinforces the contrast by acting simultaneously on the two zones (exposed and not exposed to light) since it reinforces the antagonistic effects by creating on the substrate a coating which is stable in aqueous and/or organic solution, with different structural units and/or physicochemical properties, the size and spatial distribution of which on the substrate are controlled. Such a process making it possible to create a film with a "pattern" can advantageously be used in the printing field or in the biomedical field to create in particular a "lab on a chip".

According to one particular embodiment of the invention, the surface of the substrate will be free of polyelectrolyte.

The substrate may be of any shape and in particular may have a surface to be covered that is flat or shaped as a ring, a fibre, a hollow tube, a rod, a cylinder, a sphere or a polyhedron, it being possible for the shape to be regular or irregular, hollow or with protrusions or ridges, concave or convex.

In particular, the substrate may be an optical instrument, such as a mirror, a lens or an attenuator, or a sensor, such as a biosensor or an organic field-effect transistor. It may also be a pipe, in particular made from metal such as steel or aluminium, or a plate or a cylinder, in particular a plate or a cylinder used in printing.

"Attenuator" is to be understood to mean a device making it possible to partially absorb light.

"Sensor" is to be understood to mean a device capable of detecting or assaying a molecule (analyte) in a gas or liquid phase, such as metal ions which may be toxic, sugars in the blood in particular for diabetic subjects, proteins, DNA strands, or trinitrotoluene (TNT) in the context of detecting antipersonnel land mines.

The efficacy of these sensors is generally based on the properties of a polymer film which partially covers said sensors and which makes it possible to detect the analyte, in particular by chemical affinity therewith.

It is therefore important to be able to deposit polymer films which remain stable over time, even in a vapour or liquid medium, and without the physicochemical properties of the film being altered by a chemical treatment for example.

As sensors, mention may be made in particular of biosensors and organic field-effect transistors.

"Biosensor" is to be understood to mean a sensor making it possible to detect biological molecules, such as DNA, RNA, proteins or sugars.

"Organic field-effect transistor" is to be understood to mean a device comprising successively a metal electrode, an insulating layer, which may be based on silicon oxide or insulating plastic, and an organic semiconductive layer (conjugated polymer) sandwiched between two metal electrodes.

The mode of operation of such a sensor is based on a change in the electrical characteristics in the presence of the analyte to be assayed. The major problem encountered by these devices is the fact that they are difficult to use in aqueous medium, largely due to the delamination of the polymer film.

Such a problem could therefore be solved with the process of the present invention and would thus make it possible to detect analytes even in solution.

The mean size of the nanoparticles used in the process of the invention is advantageously between 1 and 200 nm, in particular between 2 and 200 nm, preferably between 3 and 50 nm, and more preferably between 3 and 20 nm. These nanoparticles may in particular be of substantially spherical shape (in this case, the size of the nanoparticles corresponds to the diameter thereof) and may have in particular crystalline and/or amorphous facets.

The nanoparticles may also be nanotubes. In this case, the above-defined size of the nanoparticles corresponds to the internal diameter of the nanotubes, it being possible for the latter to have a length of at least 200 nm to 1 cm, advantageously 200 nm to 1 mm, and preferably 200 nm to 1 µm. These nanotubes are of interest in particular for their mechanical properties making it possible to reinforce the mechanical strength (fibres, composite materials, thin films), their conductive or semiconductive electrical properties, their field-effect transmission properties, their optical properties in ultrafast optics for example, the segregation of gas or liquid molecules, of ions as membrane, filtration.

The nanoparticles may be selected from nanoparticles based on carbon, in particular carbon black or graphite; and/or nanoparticles based on silicon; and/or nanoparticles based on metal such as aluminium, silver, cadmium, cerium, chromium, cobalt, copper, tin, iron, gallium, manganese, nickel, gold, palladium, platinum, lead, ruthenium, selenium, sulphur, titanium, thorium, tungsten, yttrium, zinc, zirconium, and mixtures and alloys thereof; and/or nanoparticles based on a mineral, in particular metal, oxide, hydroxide or carbonate, such as cerium oxide, titanium oxide, silicon oxide such as silica, aluminium oxide, yttrium oxide, aluminium hydroxide, zirconium oxide, yttrium oxide, yttrium carbonate, iron oxide, gold oxide, silver oxide, palladium oxide, sulphur oxide, selenium oxide, cadmium oxide, thorium oxide or chromium oxide; organometallic nanoparticles; polymer nanoparticles such as nanoparticles of natural or synthetic latex, of a coordination polymer such as Prussian blue and the like, or of biopolymers such as chitin; nanoparticles based on ceramics such as silicon nitride; nanoparticles based on clays such as smectites, kaolins, illites, chlorites or attapulgites; and/or nanoparticles based on nanotubes which may be hybrid and/or functionalised nanotubes, in particular based on carbon, boron nitride, molybdenum sulphide, tungsten sulphide, copper sulphide, nickel chloride, cadmium chloride or cadmium iodide.

These nanoparticles may thus also play a role as a pigment, such as in particular nanoparticles of metal oxide (such as titanium oxide) or organic or organometallic nanoparticles, which may be of interest in the case of depositing a transparent polymer film.

In one particular embodiment, the nanoparticles may be selected from nanoparticles of mineral oxide such as cerium oxide, titanium oxide, silicon oxide, aluminium oxide, zirconium oxide or chromium oxide, and polymer nanoparticles.

"Polymer nanoparticles" are to be understood to mean nanoparticles consisting of a polymer such as natural or synthetic latex.

Advantageously, the nanoparticles will be selected from nanoparticles based on a mineral, in particular metal, oxide, hydroxide or carbonate, such as cerium oxide, titanium oxide, silicon oxide, aluminium oxide, aluminium hydroxide, zirconium oxide, yttrium oxide, yttrium carbonate, iron oxide, gold oxide, silver oxide, palladium oxide, sulphur oxide, selenium oxide, cadmium oxide, thorium oxide or chromium oxide.

Also advantageously, the nanoparticles will be nanoparticles of mineral oxide, such as cerium oxide, titanium oxide, silicon oxide such as silica, aluminium oxide, zirconium oxide or chromium oxide, and in particular will be nanoparticles of cerium oxide or silica, and advantageously cerium oxide.

Preferably, the nanoparticles will be substantially spherical.

Advantageously, the nanoparticles cover at least 2%, preferably between 5 and 70%, preferably between 20 and 40% and more preferably approximately 30% of the surface of the substrate to be covered.

This degree of coverage of the substrate by the nanoparticles can be measured in particular in the following two ways:
  by atomic force imaging, by scanning the surface of the substrate so as to visualise the nanoparticles and thus to count the latter by means of image analysis methods, or
  by measuring the refractive index of the adsorbed layer of nanoparticles on the substrate by using a device for measuring surface forces (Surface Force Apparatus). Since the refractive index of a nanoparticle in volume is known (for example by measuring the dσ/dc increment, that is to say the variation in the refractive index as a function of the variation in the volume concentration of nanoparticles), the degree of coverage is deduced therefrom.

These two methods give equivalent results, which makes it possible to confirm the results obtained by carrying out two different measurements for the degree of covering.

In one preferred embodiment, the adsorption of the nanoparticles takes place by immersing the substrate in a dispersion of said nanoparticles in a solvent, and preferably in an aqueous solution, or by spraying the nanoparticles onto the free surface of the substrate to be covered, preferably followed by a step of washing the substrate and by a drying step.

When the adsorption of the nanoparticles takes place by immersion, the immersion time of the substrate may be advantageously between 10 seconds and 10 hours, preferably between 1 minute and 1 hour, and more preferably between 1 and 10 minutes.

In aqueous solution, the nanoparticles are electrically charged and can thus adhere electrostatically and irreversibly to the surface of the substrate to be covered, which is also electrically charged in aqueous solution. The choice of nanoparticles used will therefore depend on the type of substrate and on its electrical behaviour in solution. As explained above, this choice will depend on the different interactions involved and will depend in particular on the isoelectric point of the surface of the substrate.

The dispersions, also called suspensions, of nanoparticles are often referred to by the term colloidal dispersions or suspensions.

Furthermore, the nature of the polymer used in the context of the present invention has little influence. Thus, any type of polymer can be used to cover the surface of a substrate according to the present invention. Once deposited, the polymer may therefore be crystalline or amorphous.

Of course, the melting temperature of the polymer used will have to be below the temperature of the environment in which said polymer is located once deposited on the substrate. Similarly, if the polymer is in a liquid medium, the latter must not be a solvent for said polymer, in order to avoid the dissolution of the latter.

In particular, the polymer may be selected from thermoplastic polymers, such as polymethacrylates, for instance polymethyl methacrylate (PMMA) or polyethyl methacrylate (PEMA), polyphenylene oxide (PPO), polyphenylene sulphide (PPS), polypropylene or polyvinyl chloride (PVC); thermosetting polymers, such as epoxy resins, polycarbonates, polyimides or polydicyclopentadiene (PDCPD); elastomers, such as silicones, for instance polydimethylsiloxane (PDMS), polyurethanes, polyisobutylene, polychloroprene (PCP), polybutadiene or polyisoprene (PI); natural polymers, such as cellulose, latex or starch; polyesters, such as polyethylene terephthalate (PET); cationic polyelectrolytes, such as poly-L-lysine (PLL) or polyallylamine (PAH); anionic polyelectrolytes, such as poly-L-glutamic acid (PGA) or polystyrene sulphonate (PSS); polyketones such as poly(aryl ether ketones); polyamides such as polyaramides; polyacrylonitriles; polycyanoacrylates; polyethersulphones; polystyrene (PS); polytetrafluoroethylene (PTFE); polyethylene; polyvinylpyrrolidone (PVP); polyvinyl acetate (PVA or PVAc); crosslinked, branched or star polymers; copolymers; and dendrimers.

The polymer used may be in particular a fluoropolymer or fluorocopolymer such as polytetrafluoroethylene (PTFE), ethylene-tetrafluoroethylene polymer (ETFE), polychlorotrifluoroethylene, perfluoropropylene, poly(heptafluorobutyl acetate), the copolymer of vinylidene fluoride and chlorotrifluoroethylene, the copolymer of vinylidene fluoride and perfluoropropene, the polyester of 2,2,3,3,4,4-hexafluoropentanediol and adipic acid), or 3,3,3-trifluoropropylmethylsilicone.

The polymer used may also be a mixture of the different polymers mentioned above.

Preferably, the polymer may be selected from thermoplastic polymers, such as polymethyl methacrylate (PMMA) or polyethyl methacrylate (PEMA), cationic polyelectrolytes, such as poly-L-lysine (PLL) or polyallylamine (PAH), and anionic polyelectrolytes, such as poly-L-glutamic acid (PGA) or polystyrene sulphonate (PSS).

According to one particular aspect of the invention, the polymer will not be a polyelectrolyte as defined above.

Furthermore, the process of the invention makes it possible to deposit polymer films of highly variable thickness and in particular very thin films, but without considerable fluctuations in the thickness of the polymer film over the entire surface of the substrate.

In particular, the thickness of the polymer film may be between 20 nm and 100 µm, and preferably between 50 nm and 100 µm.

Similarly, the variation in the thickness of the polymer film over the entire surface of the covered substrate may advantageously be less than 10 nm, preferably less than 5 nm and more preferably less than 1 nm.

The thickness of the deposited polymer film is measured by white light interferometry (fringes of equal chromatic order). Any local variations in thickness of the film on the substrate and the topography thereof are thus easily revealed, since the resolution of the technique allows a measurement with a precision of 0.2 nm.

For optically opaque substrates and/or for applications in which the precision with which the thickness is measured is less crucial, other techniques may be envisaged (such as profilometry, AFM imaging after scratching, ellipsometry, electron or X-ray microscopy).

Moreover, the polymer film may also comprise metal or polymer particles of nanometric size, or possibly of micrometric size. It would also be possible to envisage incorporating in the polymer film nanoparticles, pigments or nanotubes as defined above.

"Metal particles" are to be understood to mean solid particles of nanometric size, or possibly of micrometric size, comprising a metal such as aluminium, silver, cadmium, cerium, chromium, cobalt, copper, tin, iron, gallium, manganese, nickel, gold, palladium, platinum, lead, ruthenium, selenium, sulphur, titanium, thorium, tungsten, yttrium, zinc, zirconium, and also the oxides thereof, hydroxides thereof, carbonates thereof, and mixtures and alloys thereof.

"Polymer particles" are to be understood to mean solid particles of nanometric size, or possibly of micrometric size, comprising one or more natural or synthetic polymers. Mention may be made in particular of latex particles, optionally stabilised with a diblock copolymer. In this case, the copolymer makes it possible to avoid any aggregation of the nanoparticles within the polymer film, the copolymer consisting of one part (or block) having a greater affinity for the nanoparticles whereas the other part (or block) will have a greater affinity for the polymer of the film.

"Nanometric size" is to be understood to mean that the mean diameter of the particles is less than one micron. The nanoparticles will thus advantageously have a particle diameter of between 1 nm and 1 µm, in particular between 2 and 200 nm, preferably between 3 and 50 nm, and more preferably between 3 and 20 nm.

"Micrometric size" is to be understood to mean that the mean diameter of the particles is between 1 µm and 50 µm, preferably between 1 µm and 10 µm.

Preferably, the particles incorporated in the polymer film will have a nanometric size.

The incorporation of metal particles in the polymer film makes it possible in particular to introduce conductive, or magnetic, particles into an insulating film, thus allowing the tracing of micrometric conductive or magnetic lines or optical storage.

Similarly, the inclusion of polymer particles such as latex particles in a polymer film makes it possible to introduce particles of rather soft nature into a hard film, which thus promotes shock absorption.

Finally, in general, the introduction of particles into the polymer film makes it possible to modify the mechanical properties of the polymer film (rigidity, abrasion resistance, scratch resistance, wear resistance) and also the optical properties thereof (transparency, colouring, anti-reflection, optical storage, absorption of electromagnetic radiation so as to make the protected surface invisible in applications to prevent detection by radar for example), electrical properties thereof (conductive, semiconductive or insulating), or magnetic properties thereof.

The polymer film may be deposited by conventional methods for depositing a polymer film which are well known to the person skilled in the art, either starting from a polymer in molten form or starting from a solution of the polymer in a suitable solvent which the person skilled in the art will be able to identify easily.

Mention may be made in particular of a deposition by centrifugation (conventionally known as "spin-coating"), a deposition by dipping (conventionally known as "dip-coating"), a deposition by droplets (conventionally known as "casting"), a deposition by laminar flow or a deposition by spraying (conventionally known as "aerospray").

In one particular embodiment, the process of the invention may comprise, prior to the deposition of the polymer film, an additional step of treating the surface of the substrate to be covered so as to improve the adhesion of the polymer film onto the substrate, such as a treatment by silanisation, by cold plasma or by UV under ozone.

These different surface treatment techniques make it possible to graft onto the surface of the substrate a certain number of chemical groups such as a hydroxyl group or a chain including a silane function, which will then facilitate the adhesion of the polymer onto the substrate.

Thus, by carrying out a pretreatment of the surface of the substrate to be covered in addition to the adsorption of nanoparticles onto this surface, the adhesion of the polymer film to the substrate will be further improved.

In another particular embodiment, the process of the invention may comprise an additional treatment step after the polymer film has been deposited, in particular a heat treatment such as a postcure of the polymer film at a temperature above the glass transition temperature of the polymer.

This postcure step makes it possible in particular to eliminate any residual trace of solvent.

Advantageously, this process may be used for an anticorrosive and/or antibacterial surface treatment, and/or for the formation of polyelectrolyte multilayers and/or for adhesive bonding and more particularly for an anticorrosive and/or antibacterial treatment and/or for adhesive bonding.

The present invention also relates to a substrate coated with a polymer film obtainable by the process of the invention as described above.

Advantageously, the substrate of the invention is characterised in that the polymer film obtained by said process of the invention is chemically and topographically homogeneous.

Similarly, the interface between the substrate and the polymer film obtained by said process of the invention is advantageously essentially devoid of microscopic cavities, holes or defects, thus making it possible to avoid the phenomenon of delamination encountered with the processes of the prior art.

DESCRIPTION OF THE APPENDED FIGURES

FIGS. 1a and 1b respectively show the image of the fringes of equal chromatic order (F.E.C.O.) obtained by white light interferometry and the image of the topography of the polymer film obtained by atomic force microscopy (AFM) for a polymer film which has been deposited on a substrate that has undergone a pretreatment by gas phase silanisation (see example 1).

FIG. 2a shows the image of the fringes of equal chromatic order (F.E.C.O.) obtained by white light interferometry for a substrate of the invention and FIGS. 2b and 2c show the images obtained by atomic force microscopy (topography or phase, respectively), for the same substrate immersed in water (see example 1).

FIGS. 4A1 and 4B1 show the images obtained by atomic force microscopy (topography or phase, respectively) starting from a substrate coated with a PPO film, said substrate being left in air. FIGS. 4A2 and 4B2 correspond respectively to FIGS. 4A1 and 4B1 but in the case where the substrate was immersed in water (see example 5).

FIGS. 5A1, 5B1, 5A2 and 5B2 correspond respectively to FIGS. 4A1, 4B1, 4A2 and 4B2 but for a substrate coated with a PS film (see example 5).

Figure 6A:
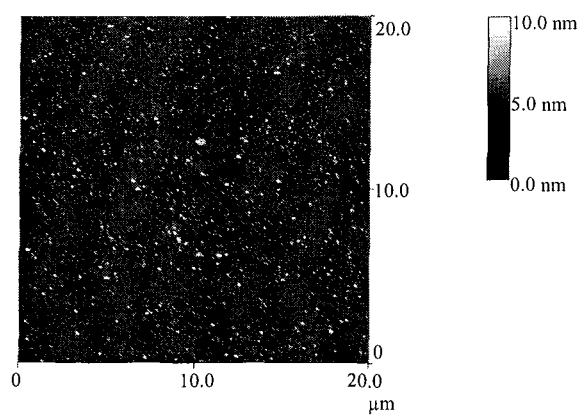
Figure 6B:
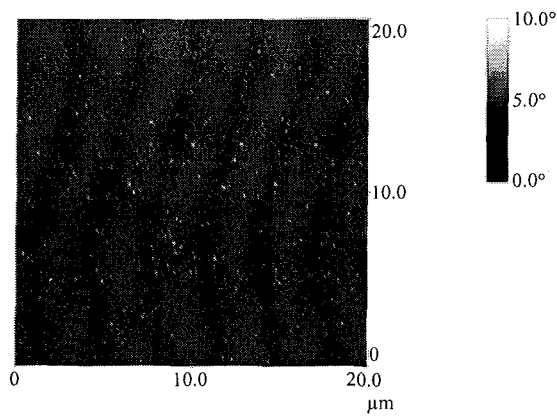

FIGS. 6A and 6B correspond respectively to FIGS. 4A2 and 4B2 but for a substrate coated with a PVP film (see example 5).

FIGS. 7A1, 7B1, 7A2 and 7B2 correspond respectively to FIGS. 4A1, 4B1, 4A2 and 4B2 but for a substrate coated with a PI film (see example 5).

FIGS. 8A1, 8B1, 8A2 and 8B2 correspond respectively to FIGS. 4A1, 4B1, 4A2 and 4B2 but for a substrate coated with a PVC film (see example 5).

FIGS. 9A1, 9B1, 9A2 and 9B2 correspond respectively to FIGS. 4A1, 4B1, 4A2 and 4B2 but for a substrate coated with a PVAc film (see example 5).

Figure 10A:
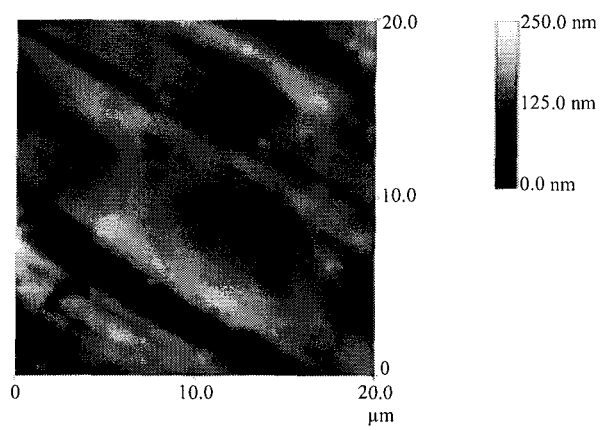
Figure 10B:
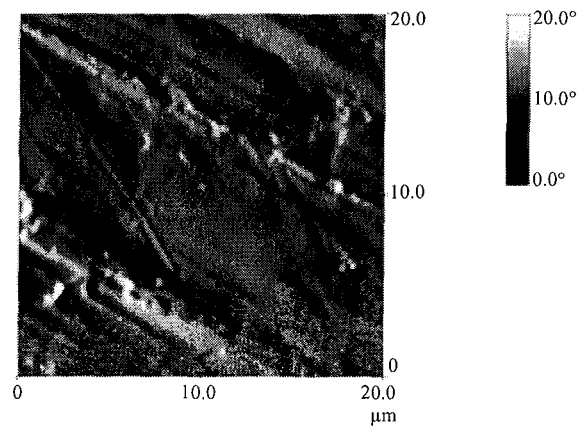

FIGS. 10A and 10B correspond respectively to FIGS. 4A2 and 4B2 but for the steel substrate of example 6).

EXAMPLES

The examples given below make it possible to illustrate the invention without limiting it in any way to these examples alone.

Example 1

Substrate: semicylinder with a radius of curvature of approximately 2 cm made from mica muscovite (aluminosilicate).
Polymer: polyethyl methacrylate (PEMA).
Nanoparticles: cerium oxide.

The substrate was selected for the difficulty in covering it with a polymer film that is stable in liquid medium since this substrate has the following characteristics:

chemically inert, which makes it impossible the anchoring of polymer macromolecules by conventional methods such as a simple deposition of the polymer optionally preceded by a treatment by plasma and/or silanisation;

strongly hydrophilic, which makes it incompatible with hydrophobic polymers and encourages dewetting and delamination;

lack of roughness at the atomic level, which makes it more difficult the anchoring of a polymer film and encourages the formation of cavities; and curved geometry, which makes it difficult for the film to mate perfectly with the convexity or concavity of the substrate.

1. Deposition of the Polymer Film

In order to demonstrate the benefit of depositing nanoparticles on the surface of the substrate beforehand, the polymer film was deposited:

(1) directly onto the substrate, or
(2) onto the substrate after treatment of the surface by silanisation (technique conventionally used to improve the anchoring of a polymer film by grafting chemical groups onto the surface of the substrate), or
(3) onto the substrate after adsorption of nanoparticles onto its surface (process of the invention).

In each of these cases, the polymer film was deposited by centrifugation, this technique being better known under the term "spin-coating".

This technique consists of depositing a droplet of solution of polymer in a solvent in the centre of the substrate which is held by suction (vacuum) on the plate of a spin-coater. A strong and instantaneous acceleration is then applied to this system (by rotation at high speed), which flattens the droplet and distributes it over the surface of the substrate. The film is then left to dry by evaporating the solvent at a constant speed of rotation.

These films were deposited by a Gyrset RC 05 spin-coater (Suss Microtech) located on a horizontal laminar air flow hood placed in a clean room, so as to avoid to the greatest possible extent any contamination of the surfaces by debris and dust.

These cleanliness precautions were applied only in view of the experimental techniques used to characterise the polymer films which require great cleanliness conditions, but less strict conditions could be employed depending on the envisaged future use of the substrate covered with the polymer film.

The parameters that were used for the spin-coater are as follows:

acceleration of 2500 rpm$^{-1}$/s$^{-1}$, and
rotation speed of 2500 rpm for 60 s.

The solvent used to place the polymer in solution is toluene.

A postcure of the film obtained after the "spin-coating" was carried out at 73° C., since the glass transition temperature of PEMA is 63° C., for a duration of minutes in a preheated dynamic vacuum oven. This postcure makes it possible to eliminate any residual traces of solvent, but it is not indispensable.

The thickness of the polymer film thus obtained increases linearly with the PEMA concentration (up to 30 g/l$^{-1}$, maximum concentration studied in this application).

2. Treatment of the Surface of the Substrate by Silanisation

In case (2), the surface of the substrate was pretreated by gas phase silanisation prior to the deposition of the polymer film.

This technique makes it possible to graft chemical groups (silane groups) onto the surface of the substrate which will act as coupling agents to increase the adhesion of the film to the substrate.

The mica substrate, freshly cleaved, is placed in the chamber of a water plasma reactor so as to activate the surface by creating OH bonds on the surface of the mica. The plasma is carried out for 200 s at a power of 15 W and at a pressure of 8000 Pa. The mica substrate is then placed in a vacuum bell jar and transferred to a glove box under an argon atmosphere in order to carry out the gas phase silanisation for 12 hours using (3-(aminopropyl)triethoxysilane). The mica substrate is again transferred to a bell jar in order to avoid any contact with oxygen, and the polymer film is deposited as described above.

3. Treatment of the Surface of the Substrate by Adsorption of Nanoparticles

In case (3), nanoparticles of cerium oxide are adsorbed onto the surface of the substrate, according to the invention.

Cerium oxide, in powder form and of chemical formula $CeO_2 (HNO_3)_{0.5} (H_2O)_4$ is dissolved at a concentration of 20 g/l$^{-1}$ (volume fraction 0.003) in deionised water. This makes it possible to obtain a stable colloidal solution with a pH equal to 2 of nanoparticles of cerium oxide (Spalla, O. et coll., *J. of colloid and interface science* 1997, 192, 43-65). These nanoparticles are positively charged and have a mean diameter of 5 nm.

The mica muscovite, for its part, is negatively charged in aqueous solution.

The mica surface to be covered, freshly cleaved, is therefore immersed for 3 minutes in this solution of nanoparticles of cerium oxide, which allows the irreversible adsorption of nanoparticles onto the surface of the substrate by virtue of electrostatic interactions. At the end of the 3 minutes, the mica surface is rinsed and then left to dry. The surface area of the substrate covered with nanoparticles is then around 30%.

Once the nanoparticles have been irreversibly adsorbed and the surface of the substrate has been dried, the polymer film is deposited according to the method described above.

4. Tests of Stability in Liquid Medium

Case (1)

When the substrate (1), covered directly with a PEMA film, is immersed in water, the PEMA film detaches immediately and completely from the mica substrate. This phenomenon is independent of the thickness of the films deposited (200 nm to few microns).

The same result is observed when the polymer film is deposited by "casting", that is to say by depositing a droplet of polymer solution onto the mica and then drying in the open air or under a controlled solvent atmosphere.

The problem of adhesion of the film onto the substrate encountered in the present case is therefore not due to the technique used for depositing the polymer film.

Case (2)

In the case of a pretreatment by silanisation of the mica surface to be covered, the PEMA film deposited on the substrate (2) does not exhibit any visible detachment when the substrate is immersed in water.

However, checks of the film were carried out in terms of topography by white light interferometry (Surface Force Apparatus, SFA) and by atomic force imaging (AFM). The results are shown respectively in FIGS. 1*a* and 1*b*.

Figure 1A:
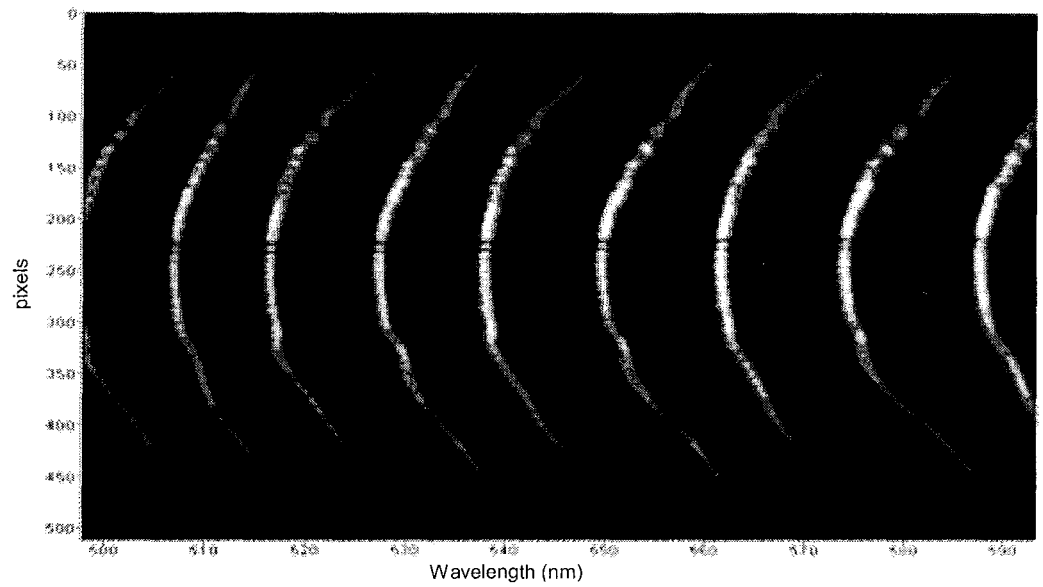

The image of the fringes of equal chromatic order (F.E.C.O.) obtained by white light interferometry shows the presence of modulations along the interference fringes (FIG. 1*a*). This reveals the presence of cavities of microscopic size (of around or less than one micrometer) at the mica/PEMA film interface, into which the aqueous solution has infiltrated, thus creating ripples on the film.

Figure 1B:
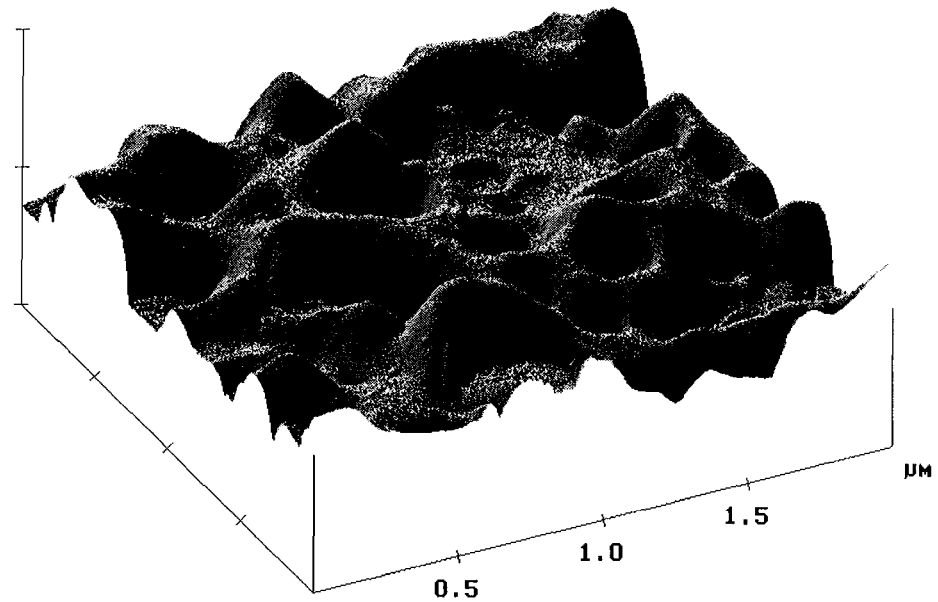

Similarly, the "ripples" observed in FIG. 1*b* reveal the presence of cavities at the mica/PEMA interface, into which water has infiltrated.

The presence of these microscopic cavities will then promote delamination of the polymer film.

The same results were obtained when silanisation was carried out in a liquid phase (ethanol) using the same silane compound.

This therefore shows that the number of anchoring points formed by silanisation, that is to say the density of silane groups on the surface of the substrate, is insufficient to allow good anchoring and thus a good adhesion of the polymer film on the substrate.

Case (3)

When the substrate (3) is immersed in water, the PEMA film remains perfectly anchored on the substrate and remains stable in aqueous solution for at least several weeks.

The F.E.C.O.s obtained by white light interferometry (see FIG. 2a) are perfectly smooth, uniform and exhibit no fluctuations in thickness and no longer contain ripples, contrary to those obtained for the substrate (2) that had undergone silanisation prior to the deposition of the polymer film. This therefore shows the absence of any formation of microscopic cavities between the substrate and the polymer film and the absence of any defects or holes in the polymer film.

The images obtained by atomic force microscopy (AFM) are shown in FIGS. 2b and 2c (FIG. 2b: topography, FIG. 2c: phase).

The mean roughness of the PEMA film is thus around 0.5 nm over a zone measuring 400 $\mu m^2$ (FIG. 2b). The image obtained in phase moreover indicates that the polymer film is perfectly homogeneous over the entire surface.

The same results were obtained after immersion of the substrate for durations longer than 10 days in deionised water, salted water or in the presence of surfactants, these different conditions promoting the delamination of the polymer film.

Thus, the adsorption of nanoparticles onto the substrate appears to enable the polymer film to anchor between the nanoparticles, which permits a perfect adhesion of the film onto the substrate, even after long periods of immersion of the substrate in aqueous solution.

It should also be noted that the presence of the nanoparticles has no effect on the roughness of the PEMA film, said roughness being around 0.5 nm over a zone with a surface area of 400 $\mu m^2$.

Figure 3:
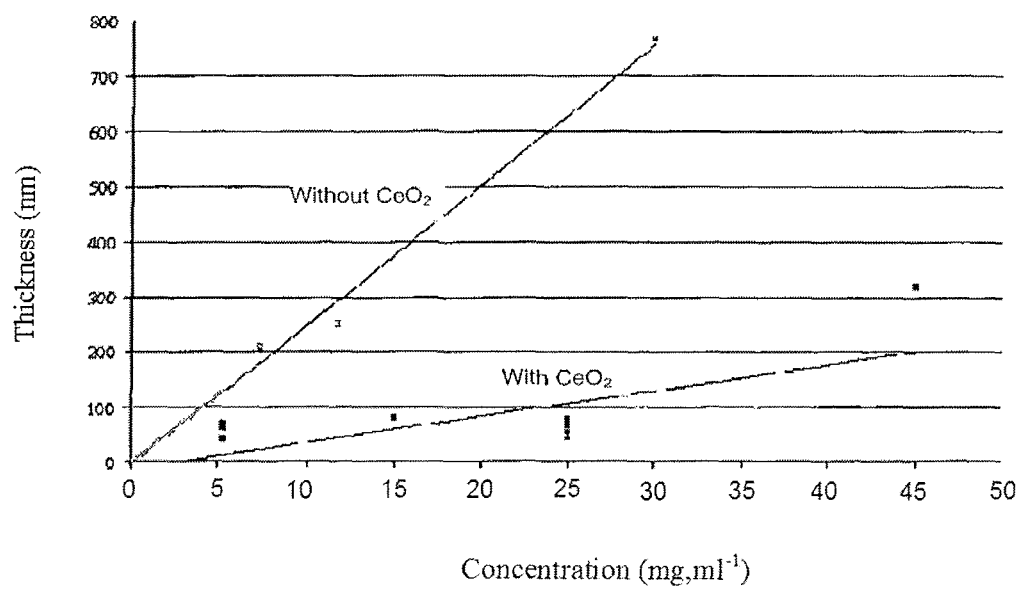
FIG. 3 shows the thickness of the polymer film obtained as a function of the PEMA concentration in the solvent, in the presence or in the absence of nanoparticles of cerium oxide adsorbed onto the substrate prior to deposition of the polymer film (see example 1).

As already mentioned above, the thickness of the film increases linearly with the PEMA concentration. However, the final thickness of the polymer film obtained is in fact smaller in the presence of nanoparticles adsorbed onto the substrate than in the absence thereof (FIG. 3).

This can be explained by the fact that only the polymer located close to the nanoparticles is attached, the rest being ejected during the "spin-coating". This also explains why there is better adhesion, all the chains close to the substrate offering anchoring points. The films obtained are therefore thinner than they would be in the absence of these anchoring points.

Remarkably, very thin films (having a thickness of around few radii of gyration) which are stable in a liquid environment can be obtained. For example, with a concentration of 25 mg/ml$^{-1}$, a film having a thickness of 67 nm can be obtained. A film having a thickness of 23 nm has also been able to be deposited.

Moreover, the low hysteresis between the advancing contact angle (76±1°) and the receding contact angle) (63±1°) of the water on the PEMA surfaces bears witness to a considerable macroscopic homogeneity of the surface, both topographically and chemically.

Example 2

Substrate: glass
Polymer: PEMA or PMMA (polymethyl methacrylate) or PS (polystyrene)
Nanoparticles: cerium oxide The deposition according to the invention of a polymer film of PEMA, PMMA or PS onto glass as the substrate was carried out under the same conditions as for example 1 after adsorption of nanoparticles of cerium oxide onto the substrate.

This deposition was also carried out by dip-coating, that is to say by dipping the substrate into a solution of the polymer in toluene.

The same tests of stability of these polymer films after immersion in an aqueous solution were carried out and showed the perfect adhesion of the polymer films to the glass.

Example 3

Substrate: gold
Polymer: PEMA or PMMA or PS
Nanoparticles: cerium oxide

The deposition according to the invention of a polymer film of PEMA, PMMA or PS onto gold as the substrate was carried out under the same conditions as for example 1 after adsorption of nanoparticles of cerium oxide onto the substrate.

This deposition was also carried out by dip-coating, as in example 2.

The same tests of stability of these polymer films after immersion in an aqueous solution were carried out and showed the perfect adhesion of the polymer films to the gold.

Example 4

Substrate: silicon
Polymer: PEMA or PMMA or PS
Nanoparticles: cerium oxide

The deposition according to the invention of a polymer film of PEMA, PMMA or PS onto silicon as the substrate was carried out under the same conditions as for example 1 after adsorption of nanoparticles of cerium oxide onto the substrate.

This deposition was also carried out by dip-coating, as in example 2.

The same tests of stability of these polymer films after immersion in an aqueous solution were carried out and showed the perfect adhesion of the polymer films to the silicon.

Example 5

Substrate: mica muscovite
Polymer: polyphenylene oxide (PPO) or polystyrene (PS) or polyvinylpyrrolidone (PVP) or polyisoprene (PI) or polyvinyl chloride (PVC) or polyvinyl acetate (PVAc)
Nanoparticles: cerium oxide The deposition according to the invention of a polymer film of PPO, PS, PVP, PI, PVC or PVAc onto mica as the substrate was carried out under the same conditions as for example 1 after adsorption of nanoparticles of cerium oxide onto the substrate.

This deposition was also carried out by dip-coating, as in example 2.

The same tests of stability of these polymer films after immersion in an aqueous solution were carried out and showed the perfect adhesion of the polymer film to the mica.

The results obtained are shown in FIGS. 4 (PPO), 5 (PS), 6 (PVP), 7 (PI), 8 (PVC) and 9 (PVAc).

The mean roughness was also calculated on the basis of the topographic images shown in FIGS. 4 to 9, and the following results were obtained:

| Polymer covering | Mean roughness | |
|---|---|---|
| the substrate | measured in air | measured in water |
| PPO | 0.22 nm | 0.26 nm |
| PS | 0.36 nm | 0.33 nm |
| PVP | 0.24 nm | 0.74 nm |
| PI | 86.2 nm | 69.6 nm |
| PVC | 38.2 nm | 27.1 nm |
| PVAc | 0.29 nm | 0.78 nm |

Example 6

Substrate: stainless steel
Polymer: polyethyl methacrylate (PEMA)
Nanoparticles: cerium oxide The deposition according to the invention of a polymer film of PEMA onto stainless steel as the substrate was carried out under the same conditions as for example 1 after adsorption of nanoparticles of cerium oxide onto the substrate.

This deposition was also carried out by dip-coating, as in example 2.

The same tests of stability of these polymer films after immersion in an aqueous solution were carried out and showed the perfect adhesion of the polymer film to the stainless steel.

It is thus found that the high degree of roughness of the surface of the steel is not an obstacle to the adhesion of the polymer film to the substrate. In fact, zones comprising ridges having a summit with a height of more than one micrometer are covered with the polymer film according to the invention and are not subject to the phenomenon of delamination of the film when the substrate is immersed in aqueous medium. The images (FIG. 10A: topography, FIG. 10B: phase) obtained by tapping mode AFM in liquid show that the substrate is homogeneously covered with the polymer film, the latter remaining stable for durations of at least several weeks when immersed in aqueous medium. The analysis of roughness based on the topography image (FIG. 10A) shows a peak-to-peak roughness of 264 nm and a mean roughness of 30 nm over the studied zone (20×20 µm$^2$).

Example 7

Substrate: brass
Polymer: polyethyl methacrylate (PEMA)
Nanoparticles: silica

The deposition according to the invention of a polymer film of PEMA onto brass as the substrate was carried out under the same conditions as for example 1 after adsorption of nanoparticles of pyrogenic silica having a diameter of 40 nm (commercially available silica) onto the substrate.

This deposition was also carried out by dip-coating, as in example 2.

The same tests of stability of these polymer films after immersion in an aqueous solution were carried out and showed the perfect adhesion of the polymer film to the brass.

Example 8

Substrate: copper
Polymer: polyethyl methacrylate (PEMA)
Nanoparticles: silica

The deposition according to the invention of a polymer film of PEMA onto copper as the substrate was carried out under the same conditions as for example 1 after adsorption of nanoparticles of pyrogenic silica having a diameter of 40 nm onto the substrate.

This deposition was also carried out by dip-coating, as in example 2.

The same tests of stability of these polymer films after immersion in an aqueous solution were carried out and showed the perfect adhesion of the polymer film to the copper.

Example 9

Substrate: aluminium
Polymer: polyethyl methacrylate (PEMA)
Nanoparticles: silica The deposition according to the invention of a polymer film of PEMA onto aluminium as the substrate was carried out under the same conditions as for example 1 after adsorption of nanoparticles of pyrogenic silica having a diameter of 40 nm onto the substrate.

This deposition was also carried out by dip-coating, as in example 2.

The same tests of stability of these polymer films after immersion in an aqueous solution were carried out and showed the perfect adhesion of the polymer film to the aluminium.

Example 10

Substrate: glass, steel
Polymer: polyethyl methacrylate (PEMA)
Nanoparticles: cerium oxide
Conditions: application of a shear stress to the substrate immersed in water The deposition according to the invention of a polymer film of PEMA onto glass or steel as the substrate was carried out under the same conditions as for example 1 after adsorption of nanoparticles of cerium oxide onto the substrate.

This deposition was also carried out by dip-coating, as in example 2.

The stability of the covering of the substrate with a polymer film was verified in the presence of flowing fluid. This property is very important for all the industrial applications in which the covered substrate is not only in the presence of a liquid environment ("static" situation in which essentially the transport phenomena are diffusive) but also when the fluid is moving (flow regime) in which the phenomena of convection and turbulence become dominant and create considerable surface forces and shear stresses at the interface between the substrate and the liquid medium.

The aim of this experiment is to test the adhesion of the polymer film prepared according to the invention to the substrate immersed in aqueous solution when a stress—a shear stress—is applied to the substrate.

The applied stress values were related to what may occur industrially. If a flow in a pipe is considered for example, in which the inner walls may be covered with polymer film according to the invention, the viscous stress being exerted on the walls is:

$$\sigma = \eta \dot{\gamma}$$

where σ: viscous stress;
η: viscosity of the liquid (in this case water $10^{-3}$ kg/m·s);
γ: shear rate, which can be estimated as v/d where v denotes the average speed of the fluid in the pipe and d denotes the diameter of the pipe.

Thus, for an aqueous fluid flowing at 10 m/s, the viscous stress is around:

σ=0.1 Pa for a pipe having a diameter of 10 cm; and
σ=0.01 Pa for a pipe having a diameter of 1 m.

In reality, the above formula cannot be applied as directly to flows in pipes of large diameter, since even if the inertial effects are dominant overall, on the contrary at the wall of the pipe the viscous effects become dominant in a boundary layer having a thickness of around:

$$\delta \approx \left(\frac{\eta d}{\rho v}\right)^{1/2},$$

where $\rho$ denotes the density of the fluid, and therefore the characteristic length involved in the expression of the shear rate is no longer the diameter of the pipe but rather the thickness of the boundary layer:

$$\gamma = \frac{v}{\delta}.$$

Thus, for an aqueous fluid flowing at 10 m/s, the viscous stress is around:
σ=30 Pa for a pipe having a diameter of 1 m.

The experimental technique employed makes it possible to simulate such a viscous stress applied to the interface of the film covering the substrate. For instance, an aqueous film is confined between a glass plate covered with PEMA according to the invention (same conditions as for example 1 after adsorption of nanoparticles of cerium oxide onto the substrate) and another surface moved in parallel with a sinusoidal movement by virtue of an oscillating piezoelectric crystal, the amplitude and frequency of which can be varied. The confinement of the film of water is controlled by interferometry in a sphere-flat geometry under a microscope, where the confining oscillating surface is a glass lens having a diameter of 25 mm connected to the oscillating piezoelectric crystal. The Newton's rings observed in a view from above make it possible to calculate the thickness of the confined liquid film. The confinement was gradually increased so as to apply an ever increasing viscous stress to the interface of the polymer film and the aqueous solution. It should be noted that the large radius of curvature of the spherical lens (50 mm) is at least 1000 times greater than the thickness of the confinement used (few micrometers to 50 μm), so that the local flow of fluid is equivalent to that between two flat surfaces.

The stability of the polymer film covering the substrate is monitored by microscopy during the experiment under shear stress, and verified afterwards by the techniques already mentioned above (cf. the general description and the other detailed examples).

Shear stresses were applied up to a frequency of 8 Hz with lateral oscillation amplitudes ranging from 50 to 1000 μm. With a sinusoidal displacement stress according to x=a sin ωt, where a is the amplitude (a ~1000 μm for example) and w is the pulsation, and of instantaneous speed v=aω cos ωt, the shear rate at the polymer/water interface is around $$\gamma = \frac{a}{d}\omega,$$

which gives a viscous stress σ of around 3 Pa for a separation between the surfaces of 17 μm and of 30 Pa for a confinement 10 times greater, i.e. the same order of magnitude as the viscous stress exerted on the walls during a rapid flow in pipes of industrial size described above. Our process shows that the substrate covered with the polymer film remains unaltered (no defect appears on the film, no delamination or unsticking of the coating is noted) and thus remains stable even for prolonged shear stresses (hours).

The same experiment was carried out for the same polymer coating on a substrate made from stainless steel. The measurement of the separation between the substrate and the oscillating confining surface is less precise due to the optical opacity of the steel substrate, but was estimated based on the settings of the experiment using a glass substrate covered with the same polymer film. In the same way as for the latter, the stability of the coating under shear stress was observed.

The same experiments were also carried out in the presence of glycerol (viscosity 1.49 Pa·s at 20° C.) so as to increase the viscous stresses exerted on the polymer film by two or three orders of magnitude. The results show that the substrate covered with the polymer film remains perfectly covered without any delamination or unsticking of the coating or any occurrence of defects on the microscopic level, and remains stable even for prolonged shear stresses (several hours).

These results make it possible to show that the polymer films deposited on a substrate according to the process of the invention can remain stable even in a moving and non-static fluid environment, these experiments having been carried out under relatively drastic conditions for the polymer film since it should be noted that an oscillating shear stress is much more drastic than viscous stresses to which a wall is subjected during a flow of fluid in a pipe.

Example 11

Substrate: stainless steel
Polymer: polyethyl methacrylate (PEMA)
Nanoparticles: α-alumina (diameter: 100-300 nm), aqueous solution at 40 g/l The deposition according to the invention of a polymer film of PEMA onto stainless steel as the substrate was carried out under the same conditions as for example 1 after adsorption of nanoparticles of α-alumina (commercially available) onto the substrate.

This deposition was also carried out by dip-coating, as in example 2.

The same tests of stability of these polymer films after immersion in an aqueous solution were carried out and showed the perfect adhesion of the polymer film to the stainless steel.

In addition, this covered substrate was tested under shear stress according to the same parameters as those presented in example 10 making it possible to show the perfect adhesion of the polymer film under these conditions.

Example 12

Substrate: mica muscovite
Polymer: polyethyl methacrylate (PEMA)
Nanoparticles: cerium oxide (sprayed onto the substrate)

The deposition according to the invention of a polymer film of PEMA onto mica muscovite as the substrate was carried out under the same conditions as for example 1 after adsorption of nanoparticles of cerium oxide onto the substrate, these being sprayed onto the substrate by an airbrush and not deposited by immersion in the solution.

The conditions for deposition of the nanoparticles are as follows: vertical substrate, sprayer placed at a distance of approximately 20 cm from the substrate, pressure of around 4 bar (compressed air) through a solution of cerium oxide at 20 g/l in water, exposure time of 30 s. In this example, a nozzle having a diameter of 400 μm was used but its opening is not a determining parameter for the process. The substrate, once sprayed, is left to dry in ambient air without any prior rinsing.

The polymer is then deposited according to the usual method. This latter deposition may also be carried out by dip-coating, as in example 2, or by spraying a solution of polymer.

The same tests of stability of these polymer films after immersion in an aqueous solution were carried out and showed the perfect adhesion of the polymer film to the mica muscovite.

The advantage of spraying the solution of nanoparticles lies in the possibility of easily coating substrates of large dimensions and of complex shapes.

Example 13

Substrate: ceramic
Polymer: polyethyl methacrylate (PEMA)
Nanoparticles: α-alumina (diameter: 100-300 nm), aqueous solution at 40 g/l The deposition according to the invention of a polymer film of PEMA onto ceramic as the substrate was carried out under the same conditions as for example 1 after adsorption of nanoparticles of α-alumina onto the substrate.

This deposition was also carried out by dip-coating, as in example 2.

The same tests of stability of these polymer films after immersion in an aqueous solution were carried out and showed the perfect adhesion of the polymer film to the ceramic, demonstrating the validity of the invention on porous substrates.

Example 14

Substrate: polyvinyl chloride (PVC)
   polytetrafluoroethylene (PTFE)
   polydimethylsiloxane (PDMS)
   polycarbonate (PC)
   epoxy resin
Polymer: polyethyl methacrylate (PEMA)
Nanoparticles: cerium oxide The deposition according to the invention of a polymer film of PEMA onto PVC, PTFE, PDMS, PC and epoxy resin as polymer substrates was carried out under the same conditions as for example 1 after adsorption of nanoparticles of cerium oxide onto the substrates.

This deposition was also carried out by dip-coating, as in example 2.

The same tests of stability of these polymer films after immersion in an aqueous solution were carried out and showed the perfect adhesion of the polymer film to the PEMA, PVC, PTFE, PDMS, PC and epoxy resin, demonstrating the validity of the invention on polymer substrates.

Example 15

Substrate: aluminium
   copper
   zinc
   brass
Polymer: polyethyl methacrylate (PEMA)
Nanoparticles: α-alumina (diameter: 100-300 nm), aqueous solution at 40 g/l The deposition according to the invention of a polymer film of PEMA onto aluminium, copper, zinc and brass as metal substrates was carried out under the same conditions as for example 1 after adsorption of nanoparticles of α-alumina onto the substrate.

This deposition was also carried out by dip-coating, as in example 2.

The same tests of stability of these polymer films after immersion in an aqueous solution were carried out and showed the perfect adhesion of the polymer film onto the aluminium, copper, zinc and brass, demonstrating the validity of the invention on metal substrates.

This example, to be compared with examples 7, 8 and 9, shows the possibility of varying the type of nanoparticles used to ensure the adhesion of the polymer film to these substrates depending on their physicochemical nature.

The invention claimed is:

1. Process for covering a substrate, at least one dimension of which is greater than one millimeter, with a polymer film, wherein, prior to the deposition of said polymer film, nanoparticles are adsorbed electrostatically onto the surface of said substrate to be covered, wherein the polymer film is not a polyelectrolyte.

2. Process according to claim 1, wherein the substrate comprises a metallic and/or mineral and/or polymer and/or organometallic and/or organic and/or ceramic surface which is intended to be covered by the polymer film.

3. Process according to claim 2, wherein
   the metallic surface to be covered is in steel, stainless steel, or a metal chosen from aluminium, gold, silver, iron, lead, copper, zinc, nickel, titanium, tungsten, chromium, platinum, cobalt, zirconium, molybdenum, tin, gallium, ruthenium, yttrium and manganese, an alloy or a mixture thereof;
   the mineral surface to be covered is in pozzolana, clays, sand, gravels, perlite, vermiculite, mineral wools, graphite, an aluminosilicate, silicon, glass, a metal oxide, or a mixture thereof;
   the polymer surface to be covered is in polytetrafluoroethylene, polydimethylsiloxane, polycarbonate, epoxy resin or polyvinyl chloride; and
   the organic surface to be covered is in cellulose, wood and derivatives thereof, or fruit shells and skins.

4. Process according to claim 3, wherein the alloy is brass or bronze, the aluminosilicate is mica, the metal oxide is sapphire, the derivative of wood is fibres or bark, and the fruit shell is coconut shell.

5. Process according to claim 1, wherein the surface of the substrate to be covered is in a single area of the surface which is optionally perforated; or is in a set of several separate areas.

6. Process according to claim 1, wherein the substrate is an optical instrument, a sensor, a pipe, a plate, or a cylinder.

7. Process according to claim 6, wherein the optical instrument is a mirror, a lens or an attenuator; the sensor is a biosensor or an organic field-effect transistor; and the plate and cylinder is for printing.

8. Process according to claim 1, wherein the mean size of the nanoparticles is between 1 and 200 nm.

9. Process according to claim 8, wherein the mean size of the nanoparticles is between 3 and 50 nm.

10. Process according to claim 9, wherein the mean size of the nanoparticles is between 3 and 20 nm.

11. Process according to claim 1, wherein the nanoparticles are selected from nanoparticles based on carbon; and/or nanoparticles based on silicon; and/or nanoparticles based on metal; and/or nanoparticles based on a mineral; organometallic nanoparticles; polymer nanoparticles; nanoparticles based on ceramics; nanoparticles based on clays; and/or nanoparticles based on nanotubes.

12. Process according to claim 11, wherein
the carbon is carbon black or graphite;
the metal is selected from the group consisting of aluminium, silver, cadmium, cerium, chromium, cobalt, copper, tin, iron, gallium, manganese, nickel, gold, palladium, platinum, lead, ruthenium, selenium, sulphur, titanium, thorium, tungsten, yttrium, zinc, zirconium, and mixtures and alloys thereof;
the mineral is a metal, oxide, hydroxide or carbonate;
the polymer is natural or synthetic latex, a coordination polymer or a biopolymer;
the ceramics is silicon nitride;
the clay is selected from the group consisting of smectites, kaolins, illites, chlorites and attapulgites; and the nanotubes are based on carbon, boron nitride, molybdenum sulphide, tungsten sulphide, copper sulphide, nickel chloride, cadmium chloride and cadmium iodide.

13. Process according to claim 12, wherein the mineral is selected from the group consisting of cerium oxide, titanium oxide, silicon oxide, aluminium oxide, yttrium oxide, aluminium hydroxide, zirconium oxide, yttrium oxide, yttrium carbonate, iron oxide, gold oxide, silver oxide, palladium oxide, sulphur oxide, selenium oxide, cadmium oxide, thorium oxide and chromium oxide; the coordination polymer is Prussian blue and the like; and the biopolymer is chitin.

14. Process according to claim 1, wherein the nanoparticles cover at least 2% of the surface of the substrate to be covered.

15. Process according to claim 14, wherein the nanoparticles cover between 5 and 70% of the surface of the substrate to be covered.

16. Process according to claim 15, wherein the nanoparticles cover between 20 and 40% of the surface of the substrate to be covered.

17. Process according to claim 1, wherein the adsorption of the nanoparticles is carried out by immersing the substrate in a dispersion of said nanoparticles in a solvent or by spraying the nanoparticles onto the free surface of the substrate to be covered.

18. Process according to claim 17, further comprising a step of washing the substrate and by a drying step.

19. Process according to claim 1, wherein the polymer is selected from the group consisting of thermoplastic polymers; thermosetting polymers; elastomers; natural polymers; polyesters; polyketones, polyamides; polyacrylonitriles; polycyanoacrylates; polyethersulphones; fluoropolymers and fluorocopolymers; polystyrene; polyethylene; polyvinylpyrrolidone; polyvinyl acetate; crosslinked, branched or star polymers; copolymers; dendrimers; and mixtures thereof.

20. Process according to claim 19, wherein
the thermoplastic polymer is selected from the group consisting of polymethacrylates, polyphenylene oxide, polyphenylene sulphide, polypropylene and polyvinyl chloride;
the thermosetting polymer is chosen from epoxy resins, polycarbonates, polyimides and polydicyclopentadiene;
the elastomer is chosen from silicones, polyurethanes, polyisobutylene, polychloroprene, polybutadiene and polyisoprene;
the natural polymer is chosen from cellulose, latex and starch;
the polyester is polyethylene terephthalate;
the polyketone is a poly(aryl ether ketone);
the polyamide is a polyaramide; and
the fluoropolymers and fluorocopolymers are selected from the group consisting of polytetrafluoroethylene, ethylene-tetrafluoroethylene polymer, polychlorotrifluoroethylene, perfluoropropylene, poly(heptafluorobutyl acetate), the copolymer of vinylidene fluoride and chlorotrifluoroethylene, the copolymer of vinylidene fluoride and perfluoropropene, the poly(ester of 2,2,3,3,4,4-hexafluoropentanediol and adipic acid), and 3,3,3-trifluoropropylmethylsilicone.

21. Process according to claim 20, wherein the polymethacrylate is polymethyl methacrylate or polyethyl methacrylate; and the silicone is polydimethylsiloxane.

22. Process according to claim 1, wherein the polymer film comprises metal or polymer particles of nanometric or micrometric size, pigments, or nanoparticles selected from nanoparticles based on carbon; and/or nanoparticles based on silicon; and/or nanoparticles based on metal; and/or nanoparticles based on a mineral; organometallic nanoparticles; polymer nanoparticles; nanoparticles based on ceramics; nanoparticles based on clays; and/or nanoparticles based on nanotubes.

23. Process according to claim 1, wherein the polymer film is deposited by centrifugation, by dipping, by droplets, by laminar flow or by spraying.

24. Process according to claim 1, further comprising, prior to the deposition of the polymer film, an additional step of treating the surface of the substrate to be covered which is intended to improve the adhesion of the polymer film onto the substrate.

25. Process according to claim 24, wherein the additional step is a treatment by silanisation, by cold plasma or by UV under ozone.

26. Process according to claim 1, further comprising a heat treatment step after the polymer film has been deposited.

27. Process according to claim 26, wherein the heat treatment step is a postcure of the polymer film at a temperature above the glass transition temperature of the polymer.

28. Process according to claim 1, wherein the substrate is covered with a treatment for an anticorrosive and/or antibacterial surface treatment, and/or for adhesive bonding.

29. Substrate coated with a polymer film obtainable by a process according to claim 1.

* * * * *